C. V. ROTE.
INTERLOCKING MEANS FOR BRAKE HEADS AND BRAKE SHOES.
APPLICATION FILED JUNE 17, 1915.
1,213,420.
Patented Jan. 23, 1917.
3 SHEETS—SHEET 3.
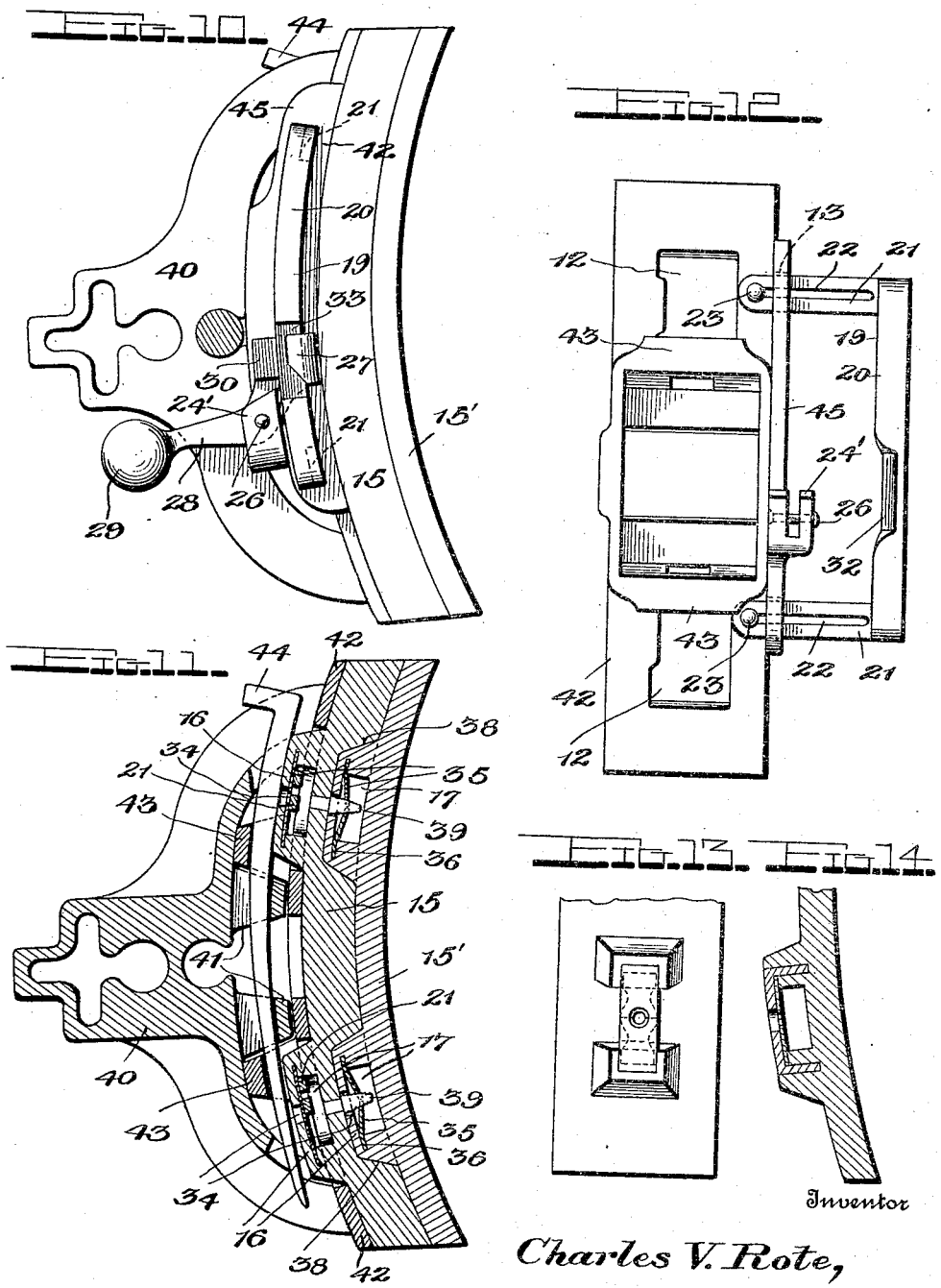
Inventor
Charles V. Rote,

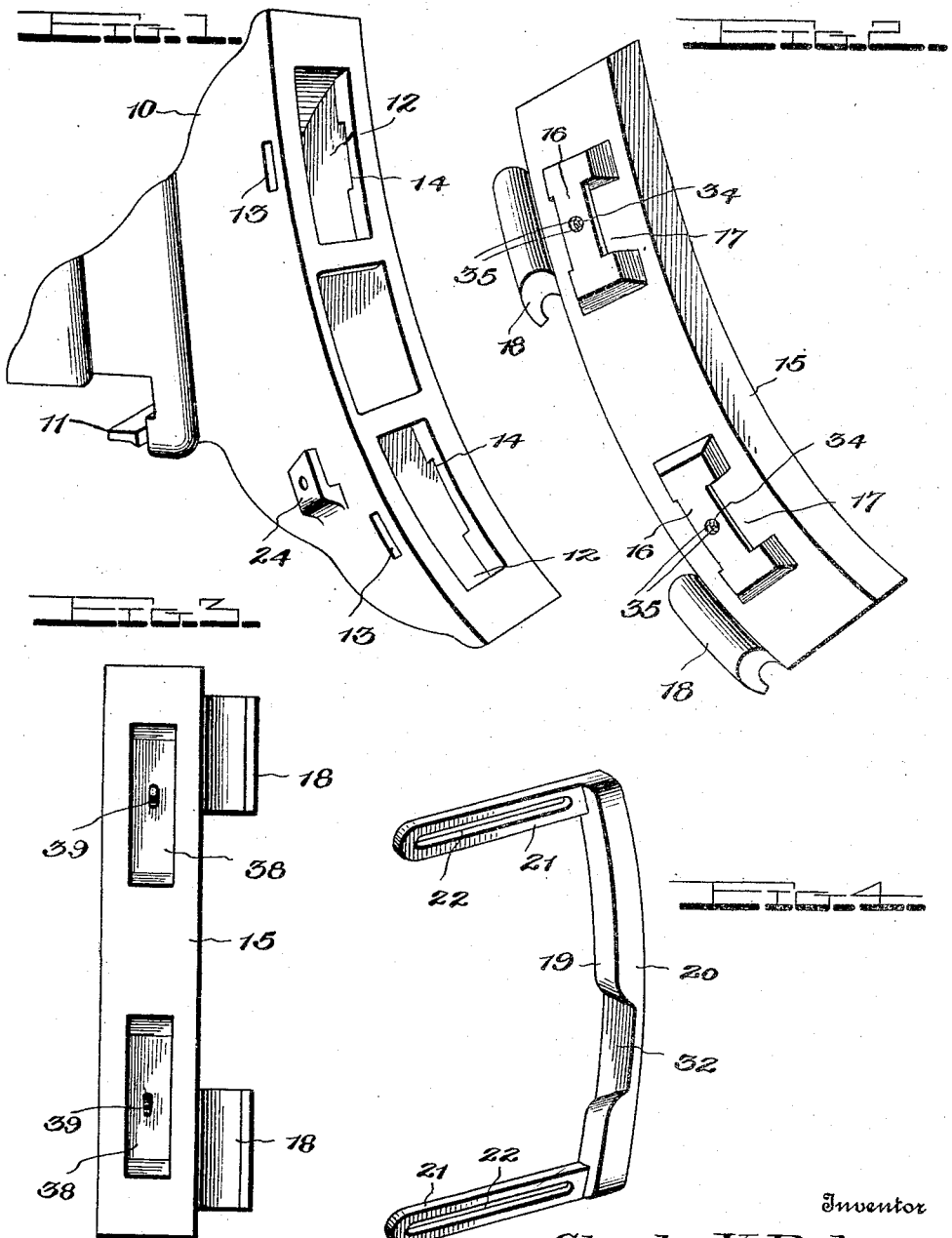

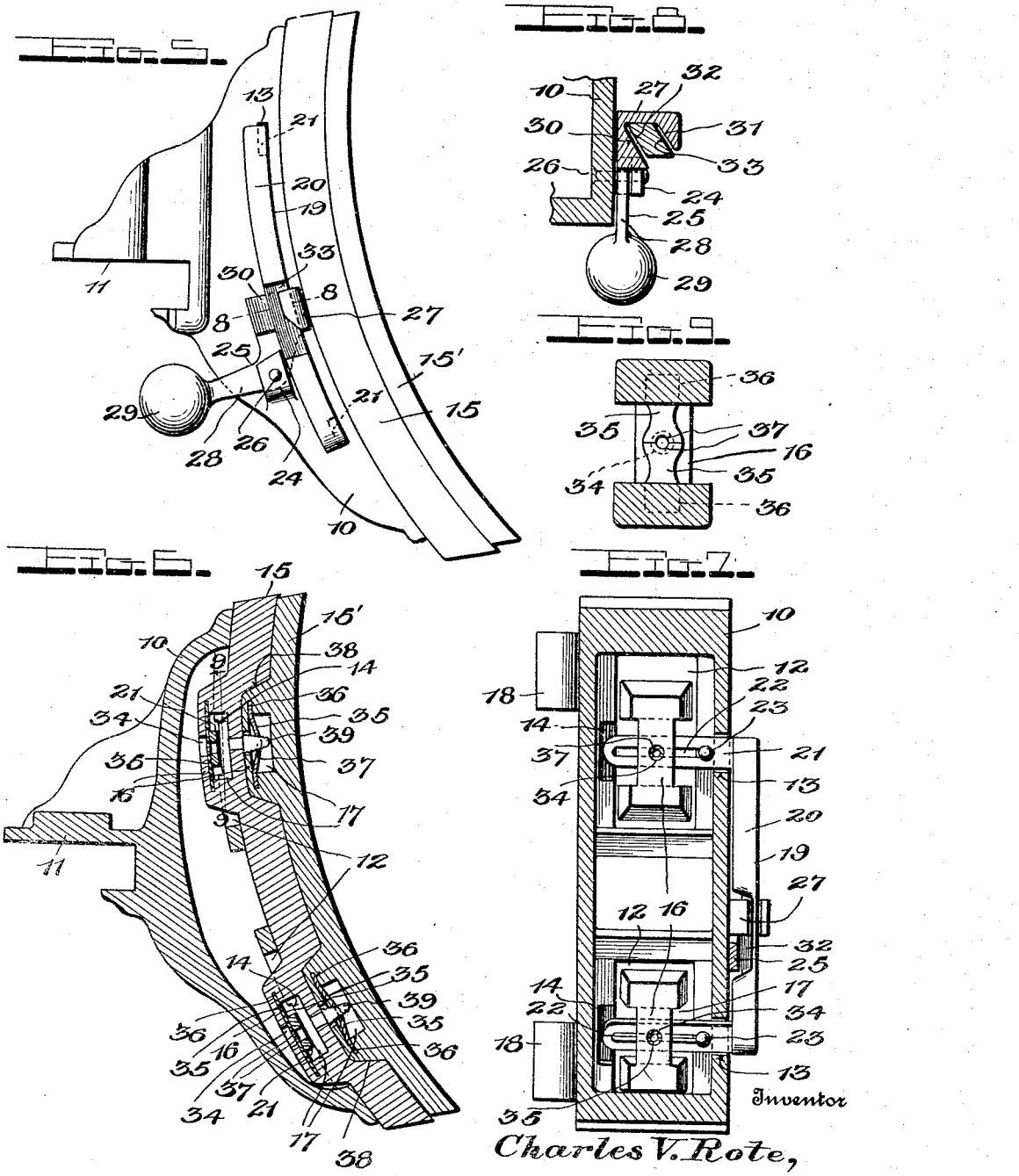

ID-6-->

UNITED STATES PATENT OFFICE.

CHARLES V. ROTE, OF LANCASTER, PENNSYLVANIA, ASSIGNOR TO C. V. ROTE BRAKE SHOE CO., OF LANCASTER, PENNSYLVANIA, A CORPORATION OF DELAWARE.

INTERLOCKING MEANS FOR BRAKE-HEADS AND BRAKE-SHOES.

1,213,420.     Specification of Letters Patent.     Patented Jan. 23, 1917.

Application filed June 17, 1915. Serial No. 34,657.

*To all whom it may concern:*

Be it known that I, CHARLES V. ROTE, a citizen of the United States, residing at Lancaster, in the county of Lancaster and State of Pennsylvania, have invented new and useful Improvements in Interlocking Means for Brake-Heads and Brake-Shoes, of which the following is a specification.

My invention relates to interlocking means for brake heads and brake shoes and has as an object to provide means for retaining the locking means, which secures the shoe in position upon a brake head or other supporting member, against displacement or accidental withdrawal from locking position by the jarring of the car or the like.

Another object of my invention is to provide the locking key which secures the shoe to the brake head or other supporting member with means whereby the locking key is prevented from being totally withdrawn from the supporting member and therefore the liability of misplacing or losing the key is prevented, and the difficulty of initially bringing the blades of the key into registry with the openings in the supporting member to insert the same therein is eliminated.

A further object of my invention is to provide a brake shoe with means whereby, when it becomes partially worn, it may be detached from the supporting member and readily and quickly secured to the working face of a new shoe, so that the material of the old shoe may be completely used up; and, further, the old shoe is secured to the new shoe in such a manner that should the old shoe become broken or worn into halves or parts, these parts would be prevented from dropping onto the track and causing the derailment of the car.

With the above and other objects, my invention consists in the novel combination and arrangement of parts which is fully described in the accompanying specification and shown in the drawings, in which,—

Figure 1 is a front outside perspective view of a brake head with the means for retaining the locking key in locking position removed. Fig. 2 is a rear outside perspective view of a brake shoe which is adapted to be attached to the head shown in Fig. 1. Fig. 3 is a front elevation of the brake shoe shown in Fig. 2. Fig. 4 is a perspective view of my improved key for securing the brake shoe to the brake head. Fig. 5 is a side elevation showing the brake head with a new shoe and a partially worn shoe secured thereon. Fig. 6 is a vertical section taken through Fig. 5. Fig. 7 is a rear view of the brake shoe assembled on the brake head, the rear of the latter being broken away. Fig. 8 is a section taken on line 8—8 of Fig. 5. Fig. 9 is a sectional view on the line 9—9 of Fig. 6. Fig. 10 is an elevational view of an old form of brake head having thereon an intermediate member, a new brake shoe and a partially worn brake shoe. Fig. 11 is a sectional view through Fig. 10. Fig. 12 is a rear view of the intermediate member showing the key in withdrawn position, the retaining means for securing the key in locking position being removed. Figs. 13 and 14 are partial elevational and sectional views respectively of the brake shoe showing the keepers formed of steel bridges and cast lugs.

Referring to the drawings, (Figs. 1, and 5 to 7), 10 is a brake head which may be secured to the usual brake beam in any suitable manner, in the present instance, flanges or lugs 11 being provided for this purpose. The head 10 comprises a hollow shell having in its front face or wall elongated spaced-apart slots 12. In the side wall of the brake head adjacent the slots 12 are elongated openings 13. On the inner face of the front wall of the head 12 in alinement with the openings 13 are grooves 14.

The brake shoe designated by the numeral 15 has upon its convex or rear surface a plurality of spaced-apart keepers 16, each of which is provided with a key-way 17. The keepers 16 are adapted to be received in the slots 12 of the brake head 10 with the key-ways 17 of the keepers in alinement or registry with the openings 13 and the grooves 14. The brake shoes are provided with the usual flanges 18 which engage the flange of the wheel.

The means for securing or locking the brake shoe to the brake head comprises a key member 19 having a handle portion 20 slightly curved to conform to the wearing face of the shoe and blades 21 extending preferably perpendicularly from the ends of the handle. The blades 21 are provided with longitudinal slots forming guideways 22 which extend just short of the ends of the blades. The blades 21, when the brake shoe is in position on the brake head, are adapted to extend through the openings 13 in the side of the brake head 10 and through the keyways 17 of the keepers 16, so that the shoe is secured in place thereby.

To prevent the total withdrawal of the key from the brake head, studs or rivets 23 are provided on the inner face of the front wall of the brake head 10 and adjacent the openings 13, and these studs are adapted to pass through the guideways 22 of the blades 21. When it is desired to remove the brake shoe the blades are withdrawn from engagement with the keepers 16, but the key member 19 cannot be totally withdrawn from the brake head 10 as this is prevented by the studs 23, and therefore the misplacement of the key member is prevented; and, furthermore, as the ends of the blades 21 at all times extend through the openings 13, the difficulty, which would arise should the key member be totally withdrawn from the brake head, of inserting the ends of the blades 21 into the openings 13 is obviated.

Referring now to my improved means for retaining the key member 19 in locking position, it will be noted that the brake head 10 is provided with an offset lug 24 adjacent the front face of the brake head 10 and between this lug and the brake head is pivoted a latch 25 by means of a pin 26. The latch 25 comprises a pivoted member having at one end a small grooved block forming a yoke 27 which is adapted to embrace the handle 20 of the key member when in locking position, (that is, when the key member is in its innermost position as shown in Fig. 7), and at the other end, a handle 28 having preferably, a ball-weight 29. The groove of the yoke 27 is inclined toward the brake head 10 so as to form an inclined or cam edge 30 facing from the brake head 10 and a cam edge 31 of like obliquity facing the brake head 10, and it will be noted that cam-edge 31 terminates short of the cam edge 30. If desired the groove of the yoke 27 need not be inclined and the edges of the same may be parallel to the side of the brake head 10 so that these edges would not constitute cams. The key member 19 may be provided with beveled or inclined faces 32 and 33 on opposite sides of the handle 20 and these beveled portions correspond in obliquity to the cam edges 30 and 31 as clearly shown in Fig. 8.

When the key member 19 is pushed inwardly to lock the shoe 15 to the brake head, the handle 28 of the latch 25 is raised slightly and the oblique or beveled face 32 of the handle 20 of the key member 19 is brought into engagement with the outwardly faced cam edge 30 of the latch 25. The handle 28 is then forced downwardly to swing the beveled face 33 of the handle of the key into engagement with the inwardly faced cam edge 31, and due to the cam action therebetween force the key member inwardly into locking position. The weight of the ball-weight 29 retains the yoke 27 of the latch in position about the handle 20 of the key member, so that the latter cannot be jarred or shaken from locking position and there is no danger of losing a shoe. When it is desired to withdraw the key member from locking position, the handle 28 of the latch 25 is raised and the cam edge 30 of the yoke 27 works against the beveled edge 32 of the handle 20 of the key member whereby the handle is withdrawn slightly away from the wall of the brake head 10, so that the key member may be easily gripped in the hand to withdraw it to its outermost position.

As stated, one of the objects of my invention is to totally use up the material of the shoe and to prevent parts of a worn shoe from dropping onto the track and derailing the car. To accomplish this object, I provide means whereby one shoe may be locked to the wearing face of a second shoe, and this means I will now describe.

The lugs or keepers 16 have central holes 34. The lugs are provided within the keyways 17 with a pair of oppositely disposed spring members or jaws 35, which may be secured to the lugs in any suitable manner, in the present instance, the opposite ends of the spring being shown as secured in grooves 36. The adjacent ends of the springs 35 are in close proximity to or abut one another and are provided with semi-circular cut-away portions 37 which jointly form apertures which are of less diameter than the holes 34 in the lugs and the centers of which are substantially coincident therewith. Upon the wearing surfaces of the brake shoes are recesses 38 which are provided with pins 39, which pins taper slightly in thickness and the edges of which are preferably serrated as shown. When a shoe, secured to the brake head, becomes worn, it is removed and a new shoe is attached to the brake head, in the manner described above. The convex surface of the old shoe, which is designated by the numeral 15′ in the drawings, is seated against the wearing face of the new shoe with the lugs or keepers 16 of the old shoe protruding into the recesses 38 of the new shoe, and with the pins 39 extending through the holes 34 of the lugs and between the ends 37 of the spring members 35. It will be noted from Fig. 6 that when the pins 39 extend between the spring members 35 the latter are depressed and their ends engage the serrations (if such are provided) of the pins such that the springs act as jaws and the old shoe 15′ after once secured to the new shoe 15 cannot be withdrawn. It is now evident that should the old shoe 15′ become so worn that it should break into halves, each half is securely retained in place on the working face of the new shoe and that accidents which might otherwise occur from the pieces falling onto the track are prevented.

In Figs. 10, 11 and 12, I disclose another application of my invention, the same being shown herein as applied to brake heads which are now in general use on steam cars and particularly on freight cars. It is understood, of course, that my improvements may be applied to various other forms of brake heads or intermediate members and that the brake heads shown herein are for purposes of illustration. The old form of brake head is designated by the numeral 40 which has on its front face the usual lugs or keepers 41. 42 is an intermediate member having keepers 43 on its convex surfaces, the keyways of which register with the keyways of keepers 41, so that the usual tapered key 44 may be inserted therethrough. The intermediate member 42 has slots 12 which correspond to the similar slots in the brake head 10 as heretofore described, and which are adapted to receive the keepers 16 of the brake shoe 15. The intermediate member is further provided with a flange 45 having openings 13 therein which are adapted to receive the blades 21 of the key member 19. Integral with the flange is an offset lug 24' which corresponds to the lug 24 of the brake shoe 10 as heretofore described, and this lug is provided with the above-described latch 25. When the old form of brake head 40 is used, to secure a shoe thereon, the intermediate member 42 is placed upon the brake head and the tapering key 44 inserted through the keepers 41 and 43. The brake shoe 15 is then seated against the intermediate member and the key member 19 is pushed inwardly, so that the blades 21 extend into the keyways 17 of the keepers or lugs 16. The latch 25 is then operated to secure the key member in position.

It is, of course, obvious that any number of blades may be used on the key and that these blades need not extend perpendicularly from the handle of the key, and, furthermore, that my invention is susceptible to various other modifications and changes, and is not limited to the specific structure shown in the accompanying drawings, except so far as they may be limited by the following claims.

What I claim is:—

1. In a brake mechanism, a supporting member, a brake shoe adapted to seat against the face of said supporting member, locking means for securing the brake shoe to said supporting member, and a pivoted latch for retaining said locking means in locking position.

2. In a brake mechanism, a supporting member, a brake shoe adapted to seat against the face of said supporting member, locking means for securing the brake shoe to said supporting member, and means adapted to drop into the path of said locking means to prevent its accidental movement from locking position.

3. In a brake mechanism, a supporting member, a brake shoe adapted to seat against the face of said supporting member, locking means for securing the shoe to said supporting member, and retaining means comprising a pivoted lever having at one end means for engaging said locking means for preventing the accidental withdrawal of the same, and at the other end means for retaining said first end in engagement with said locking means.

4. In a brake mechanism, a supporting member, a brake shoe adapted to seat thereagainst, locking means to secure the shoe in place on said supporting member, and retaining means comprising a pivoted lever having at one end a yoke adapted to engage said locking means, and at the other end a ball-weight to maintain said yoke in engagement with said locking means.

5. In a brake mechanism, a supporting member, a brake shoe adapted to seat thereagainst, a key member having blades adapted to extend transversely through said supporting member and shoe to retain the same in assembled position, and means adapted to engage said key member to retain the same in locking position.

6. In a brake mechanism, a supporting member, a brake shoe adapted to seat thereagainst, locking means for securing said brake-shoe in position, means for retaining said locking means in position, and means for initially withdrawing the locking means from locking position.

7. In a brake mechanism, a supporting member, a brake shoe adapted to seat thereagainst, locking means adapted to extend through said supporting member and said shoe, a latch comprising a pivoted member having at one end a weighted handle, and at the other end a yoke adapted to engage said locking means when the latter is in locking position, and means on the yoke for initially withdrawing the locking means from locking position.

8. In a brake mechanism, a supporting member, a brake shoe adapted to seat thereagainst, a key member comprising a handle having blades which are adapted to extend through said supporting member and said brake shoe to lock the same in assembled position, means comprising a pivoted lever having at one end a weighted handle, and at the other a yoke adapted to normally engage said handle when the key member is in locking position, and a cam edge on said yoke adapted to engage said handle whereby the locking member is initially withdrawn from locking position when said lever is given a pivotal movement.

9. In a brake mechanism, a supporting member, a brake shoe adapted to seat thereagainst, a key member comprising a handle having blades adapted to extend through said supporting member and said brake shoe to lock the same in assembled position, means comprising a pivoted lever having at one end a yoke adapted to normally engage said handle when the key member is in locking position, an outwardly faced cam on said yoke adapted to engage said handle to initially withdraw the key member from locking position when the lever is given a pivotal movement in one direction, and an inwardly-faced cam edge on said yoke adapted to engage said handle to force said key member into locking position when the lever is given a pivotal movement in the other direction.

10. In a brake mechanism, a supporting member, a brake shoe adapted to seat against the face of said supporting member, a key member having blades adapted to extend transversely through said supporting member and said shoe, and means on the said supporting member and engaging said key blades for preventing the total withdrawal of the supporting member.

11. In a brake mechanism, a supporting member, a brake shoe adapted to seat against the face of said supporting member, a key member having blades adapted to extend into said supporting member and said shoe, guideways in said blades, and studs on said supporting member and engaging in said guideways whereby the total withdrawal of the key member from said supporting member is prevented.

12. In a brake shoe, a body portion having lugs on its convex surface and recesses on its wearing face, pins in said recesses and gripping means carried by said lugs, said pins of one shoe being adapted to be engaged by the gripping means of the second shoe to lock one shoe to the wearing face of another shoe.

13. In a brake shoe, a body portion having recesses in its wearing face, pins in said recesses, lugs on the rear face of said body portion having apertures therein and spring jaws on said lugs, said lugs of one shoe being adapted to register in the recesses of a second shoe with the pins of the latter extending into said apertures and between the jaws of the former shoe to retain the two shoes in assembled position.

14. In a brake mechanism, a supporting member, a brake shoe adapted to seat thereagainst, locking means for securing said brake shoe in position, means for forcing said locking means into final locking position, means for retaining said locking means in position, and means for initially withdrawing the locking means from locking position.

15. In a brake mechanism, a supporting member, a brake shoe adapted to seat thereagainst, locking means adapted to extend through said supporting member and said shoe, a latch comprising a pivoted member having at one end a weighted handle and at the other a yoke adapted to engage said locking means when the latter is in locking position, a cam edge on said yoke for forcing said locking means into final locking position, and a cam edge on said yoke for initially withdrawing said locking means from locking position.

In testimony whereof I have hereunto set my hand in presence of two subscribing witnesses.

CHARLES V. ROTE.

Witnesses:
SAMUEL G. ELLIOTT,
JOHN H. MYERS.

Copies of this patent may be obtained for five cents each, by addressing the "Commissioner of Patents, Washington, D. C."